(12) United States Patent
Park et al.

(10) Patent No.: US 12,519,393 B2
(45) Date of Patent: Jan. 6, 2026

(54) DIRECT CURRENT TO DIRECT CURRENT (DC-DC) CONVERTER REDUCING POWER CONSUMPTION AND HEAT GENERATION

(71) Applicant: Samsung Display Co., LTD., Yongin-si (KR)

(72) Inventors: Sungchun Park, Yongin-si (KR); Jeongmin Seo, Yongin-si (KR); Yoon Young Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/762,847

(22) Filed: Jul. 3, 2024

(65) Prior Publication Data

US 2025/0030344 A1  Jan. 23, 2025

(30) Foreign Application Priority Data

Jul. 19, 2023  (KR) ................... 10-2023-0094005

(51) Int. Cl.
*G09G 3/20* (2006.01)
*H02M 1/32* (2007.01)
*H02M 3/158* (2006.01)

(52) U.S. Cl.
CPC ........ *H02M 3/1584* (2013.01); *G09G 3/2096* (2013.01); *H02M 1/32* (2013.01); *G09G 2330/021* (2013.01); *G09G 2330/045* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291
USPC ....................................... 345/76–83
See application file for complete search history.

(56) References Cited

U.S. PATENT DOCUMENTS

| | | | | |
|---|---|---|---|---|
| 10,622,900 | B1* | 4/2020 | Wei ..................... | H02M 3/1584 |
| 11,341,897 | B2* | 5/2022 | Park ..................... | H02M 3/158 |
| 11,783,745 | B2* | 10/2023 | Kang ..................... | G09G 3/20 |
| | | | | 345/204 |
| 11,978,376 | B2* | 5/2024 | Hong ................... | H02M 1/0009 |
| 12,374,254 | B2* | 7/2025 | Hong ................... | H02M 3/158 |
| 2013/0057530 | A1* | 3/2013 | Han ..................... | G09G 3/3696 |
| | | | | 345/211 |
| 2013/0235010 | A1* | 9/2013 | Park ..................... | H05B 47/25 |
| | | | | 345/212 |
| 2014/0118414 | A1* | 5/2014 | Seo ....................... | H05B 45/60 |
| | | | | 345/82 |
| 2015/0061616 | A1* | 3/2015 | Cheng ................. | H02M 3/1588 |
| | | | | 323/271 |
| 2016/0049872 | A1* | 2/2016 | Park ..................... | H02M 1/088 |
| | | | | 345/212 |

(Continued)

*Primary Examiner* — Ke Xiao
*Assistant Examiner* — Nelson Lam
(74) *Attorney, Agent, or Firm* — CANTOR COLBURN LLP

(57) ABSTRACT

A DC-DC converter includes: a master converter configured to operate to generate a panel voltage based on an input voltage regardless of a panel current, and a slave converter configured to operate to generate the panel voltage with the master converter based on the input voltage when the panel current is greater than a reference current. The master converter and the slave converter are connected to a first inductor.

19 Claims, 11 Drawing Sheets

(56) References Cited

U.S. PATENT DOCUMENTS

| | | | |
|---|---|---|---|
| 2016/0125791 A1* | 5/2016 | Park | H02M 3/1584 |
| | | | 345/76 |
| 2017/0278636 A1* | 9/2017 | Weir | H01G 4/206 |
| 2020/0175914 A1* | 6/2020 | Bae | G09G 3/3233 |
| 2020/0218861 A1* | 7/2020 | Bolton | G06K 19/0772 |

* cited by examiner

DIRECT CURRENT TO DIRECT CURRENT (DC-DC) CONVERTER REDUCING POWER CONSUMPTION AND HEAT GENERATION

BACKGROUND

This application claims priority to Korean Patent Application No. 10-2023-0094005 filed on Jul. 19, 2023, and all the benefits accruing therefrom under 35 U.S.C. § 119, the content of which in its entirety is herein incorporated by reference.

1. Field

Embodiments of the present invention relate to a display device. More particularly, embodiments of the present invention relate to a DC-DC converter included in the display device.

2. Description of the Related Art

Generally, a display device includes a display panel and a display panel driver. The display panel includes pixels, and the display panel driver includes a direct current (DC)-DC converter. The DC-DC converter generates a high panel power voltage and a panel power voltage lower than the high panel power voltage and outputs the high panel power voltage and the panel power voltage to the display panel. The display panel generates a panel current, and an intensity of a luminance is determined depending on the intensity of the panel current.

In accordance with a demand for increasing a brightness, a range of the panel current broadens. Therefore, as the range of the panel current broadens, a driving capability of the DC-DC converter is required to be improved. The driving capability of the DC-DC converter may mean a current that the DC-DC converter may tolerate. However, as the driving capability of the DC-DC converter increases, an internal resistance of the DC-DC converter may increase. When the internal resistance of the DC-DC converter increases, a conduction loss may increase, and an unnecessary power consumption and a heat generation may increase.

SUMMARY

Embodiments of the present invention provide a DC-DC converter for reducing a power consumption and a heat generation.

Embodiments of the present invention provide a display device including the DC-DC converter.

In an embodiment of a DC-DC converter according to the present invention, the DC-DC converter includes: a master converter configured to operate to generate a panel power voltage based on an input voltage regardless of a panel current, and a slave converter configured to operate to generate the panel power voltage based on the input voltage with the master converter when the panel current is greater than a reference current. The master converter and the slave converter are connected to a first inductor.

In an embodiment, when the panel current is less than or equal to the reference current, the panel current may flow to the master converter, and when the panel current is greater than the reference current, the panel current may flow divided into the master converter and the slave converter.

In an embodiment, when the panel current is less than or equal to the reference current, the master converter may be configured to generate a first inductor current which flows in the first inductor, and when the panel current is greater than the reference current, the master converter and the slave converter may be configured to generate the first inductor current together.

In an embodiment, when the panel current is greater than the reference current, the master converter and the slave converter may be connected in parallel.

In an embodiment, when the master converter and the slave converter are connected in parallel, a resultant resistance of the master converter and the slave converter may be smaller than an internal resistance of each of the master converter and the slave converter.

In an embodiment, the DC-DC converter may further include a feedback voltage generator configured to divide the panel power voltage to generate a feedback voltage, and
    an error signal generator configured to generate an error signal based on a voltage difference between the feedback voltage and a reference voltage.

In an embodiment, the master converter may include a first outputer configured to alternately turn on a first switching element and a second switching element to generate at least part of a first inductor current which flows in the first inductor, and the slave converter may include a second outputer configured to alternately turn on a third switching element and a fourth switching element to generate at least part of the first inductor current.

In an embodiment, the master converter may further include a first switching controller configured to generate a first switching signal which controls the first switching element, a second switching signal which controls the second switching element, a third switching signal which controls the third switching element and corresponds to the first switching signal, and a fourth switching signal which controls the fourth switching element and corresponds to the second switching signal, and a first sensing current sensor configured to sense a first sensing current which flows through the first switching element and a second sensing current which flows through the third switching element, and generate a first sensing voltage which corresponds sum of the first sensing current and the second sensing current.

In an embodiment, wherein the master converter may further include a first overcurrent protector configured to determine whether the sum of the first sensing current and the second sensing current is an overcurrent to generate a first enable signal which controls the first switching controller, a first adder configured to add a slope voltage to the first sensing voltage to generate a first sensing slope voltage, and a first comparator configured to compare the error signal and the first sensing slope voltage to generate a first signal and output the first signal to the first switching controller.

In an embodiment, the first switching element may include a gate terminal which receives the first switching signal, a first terminal which receives the input voltage, and a second terminal which is connected to a first node, the second switching element may include a gate terminal which receives the second switching signal, a first terminal which is connected to the first node, and a second terminal which is connected to an output node, the third switching element may include a gate terminal which receives the third switching signal, a first terminal which receives the input voltage, and a second terminal which is connected to the first node, the fourth switching element may include a gate terminal which receives the fourth switching signal, a first terminal which is connected to the first node, and a second terminal which is connected to the output node, and the first inductor may include a first terminal which is connected to the first node and a second terminal which is connected to a ground.

In an embodiment of a DC-DC converter according to the present invention, the DC-DC converter includes: a master converter configured to operate to generate a panel power voltage based on an input voltage regardless of a panel current, and a slave converter configured to operate to generate the panel power voltage based on the input voltage with the master converter when the panel current is greater than a reference current. In a first driving mode, the master converter is connected to a first inductor and the slave converter is connected to a second inductor, and in a second driving mode, the master converter and the slave converter are connected to the first inductor.

In an embodiment, in the first driving mode and the second driving mode, when the panel current is less than or equal to the reference current, the panel current may flow to the master converter, and in the first driving mode and the second driving mode, when the panel current is greater than the reference current, the panel current may flow divided into the master converter and the slave converter.

In an embodiment, in the first driving mode and the second driving mode, when the panel current is less than or equal to the reference current, the master converter may be configured to generate a first inductor current which flows in the first inductor.

In an embodiment, in the first driving mode, when the panel current is greater than the reference current, the master converter may be configured to generate the first inductor current, and the slave converter may be configured to generate a second inductor current which flows in the second inductor, and in the second driving mode, when the panel current is greater than the reference current, the master converter and the slave converter may be configured to generate the first inductor current together.

In an embodiment, in the second driving mode, when the panel current is greater than the reference current, the master converter and the slave converter may be connected in parallel.

In an embodiment, in the second driving mode, when the master converter and the slave converter are connected in parallel, a resultant resistance of the master converter and the slave converter may be smaller than an internal resistance of each of the master converter and the slave converter.

In an embodiment, the DC-DC converter may further include a feedback voltage generator configured to divide the panel power voltage to generate a feedback voltage, and an error signal generator configured to generate an error signal based on a voltage difference between the feedback voltage and a reference voltage.

In an embodiment, the master converter may include a first outputer configured to alternately turn on a first switching element and a second switching element to generate a first inductor current which flows in the first inductor in the first driving mode and at least part of the first inductor current in the second driving mode, and the slave converter may include a second outputer configured to alternately turn on a third switching element and a fourth switching element to generate a second inductor current which flows in the second inductor in the first driving mode, and to alternately turn on the third switching element and the fourth switching element to generate at least part of the first inductor current in the second driving mode.

In an embodiment, the master converter may further include a first switching controller configured to generate a first switching signal which controls the first switching element and a second switching signal which controls the second switching element in the first driving mode, and to generate the first switching signal, the second switching signal, and a third switching signal which controls the third switching element and corresponds to the first switching signal and a fourth switching signal which controls the fourth switching element and corresponds to the second switching signal in the second driving mode, and a first sensing current sensor configured to sense a first sensing current which flows through the first switching element and generate a first sensing voltage which corresponds the first sensing current in the first driving mode, and to sense the first sensing current and a second sensing current which flows through the third switching element and generate the first sensing voltage which corresponds to sum of the first sensing current and the second sensing current in the second driving mode, and the slave converter may further include a second switching controller configured to generate the third switching signal and the fourth switching signal in the first driving mode, and a second sensing current sensor configured to sense the second sensing current and generate a second sensing voltage which corresponds to the second sensing current in the first driving mode.

In an embodiment, the master converter may further include a first overcurrent protector configured to determine whether the first sensing current is an overcurrent to generate a first enable signal which controls the first switching controller in the first driving mode, and to determine whether the sum of the first sensing current and the second sensing current are the overcurrent to generate the first enable signal in the second driving mode, a first adder configured to add a slope voltage to the first sensing voltage to generate a first sensing slope voltage, and a first comparator configured to compare the error signal and the first sensing slope voltage to generate a first signal and output the first signal to the first switching controller, and the slave converter may further include a second overcurrent protector configured to determine whether the second sensing current is the overcurrent to generate a second enable signal which controls the second switching controller in the first driving mode, a second adder configured to add the slope voltage to the second sensing voltage to generate a second sensing slope voltage, and a second comparator configured to compare the error signal and the second sensing slope voltage to generate a second signal and output the second signal to the second switching controller.

In an embodiment, a voltage of a common node of the third switching element and the fourth switching element may be sensed such that a shutdown operation is performed.

In an embodiment of a display panel according to the present invention, the display panel includes a display panel including pixels, and a DC-DC converter configured to operate to output a panel power voltage to the display panel. The DC-DC converter includes a master converter configured to operate to generate the panel power voltage with the master converter based on an input voltage regardless of a panel current, and a slave converter configured to generate the panel power voltage based on the input voltage when the panel current is greater than a reference current. In a first driving mode, the master converter is connected to a first inductor and the slave converter is connected to a second inductor, and in a second driving mode, the master converter and the slave converter are connected to the first inductor.

According to a DC-DC converter according to the embodiments, the DC-DC converter may include a master converter and a slave converter which operate sequentially according to a panel current. The master converter and the slave converter may be connected to a first inductor. Accordingly, a mounting area, a power consumption, and a heat generation of the DC-DC converter may be effectively reduced.

According to a DC-DC converter and a display device according to the embodiments, the DC-DC converter may include a master converter and a slave converter which operate sequentially according to a panel current. In a first driving mode, the master converter may be connected to a first inductor and the slave converter may be connected to a second inductor, and in a second driving mode, the master converter and the slave converter may be connected to the first inductor. Accordingly, a power consumption and a heat generation of the DC-DC converter may be reduced, and the DC-DC converter may operate in the first driving mode or the second driving mode depending on a customer's a request.

BRIEF DESCRIPTION OF THE DRAWINGS

The above and other features of embodiments of the present invention will become more apparent by describing in detailed embodiments thereof with reference to the accompanying drawings, in which.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be understood that when an element is referred to as being "on" another element or "connected to" another element, it can be directly on or directly connected to the other element or intervening elements may be present therebetween. In contrast, when an element is referred to as being "directly on" another element, there are no intervening elements present. Hereinafter, embodiments of the present invention will be described in detail with reference to the accompanying drawings.

Figure 1:
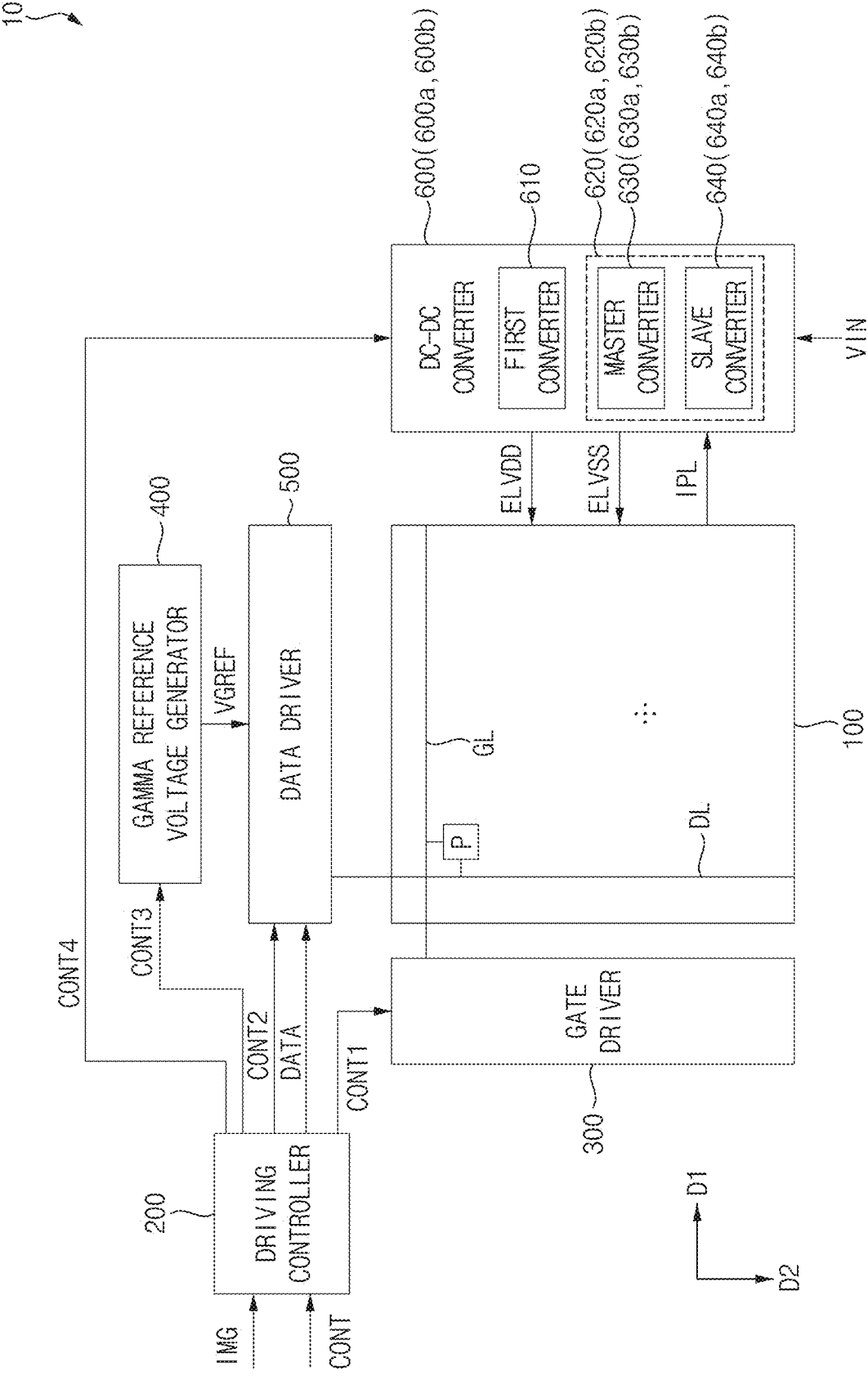
FIG. 1 is a block diagram illustrating a display device according to embodiments of present invention.

FIG. 1 is a block diagram illustrating a display device according to embodiments of present invention.

Referring to FIG. 1, a display device 10 may include a display panel 100 and a display panel driver. The display panel driver may include a driving controller 200, a gate driver 300, a gamma reference voltage generator 400, a data driver 500, and a DC-DC converter 600.

The display panel 100 may include a display region displaying an image and a peripheral region disposed adjacent to the display region.

The display panel 100 may include gate lines GL, data lines DL, and pixels P electrically connected to the gate lines GL and the data lines DL. The gate lines GL may extend in a first direction D1, and the data lines DL may extend in a second direction D2 crossing the first direction D1.

The driving controller 200 may receive input image data IMG and an input control signal CONT from an external device (not shown). For example, the input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the DC-DC converter 600 based on the input control signal CONT, and output the fourth control signal CONT4 to the DC-DC converter 600.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may output the gamma reference voltage VGREF to the data driver 500. The gamma reference voltage VGREF may have a value corresponding to each data signal DATA.

In an embodiment, the gamma reference voltage generator 400 may be disposed in the driving controller 200 or the data driver 500.

The data driver 500 may receive the second control signal CONT2 and the data signal DATA from the driving controller 200 and receive the gamma reference voltage VGREF from the gamma reference voltage generator 400. The data driver 500 may convert the data signal DATA into a data voltage in analog form. The data driver 500 may output the data voltage to the data line DL.

The DC-DC converter 600 may receive the fourth control signal CONT4 from the driving controller 200 and a panel current IPL form the display panel 100. The DC-DC converter 600 may include a first converter 610 and a second converter 620. The second converter 620 may include a master converter 630 and a slave converter 640. In FIG. 1, the slave converter 640 is shown as one, but the present invention is not limited thereto. In another embodiment, the number of slave converters 640 may be at least two.

The first converter 610 may generate a high panel power voltage ELVDD based an input voltage VIN received from an external device (not shown) in response to the fourth control signal CONT4. In an embodiment, the first converter 610 may be a boost converter. In this case, when the input voltage VIN is lower than the high panel power voltage ELVDD, the first converter 610 may step up the input voltage VIN to generate the high panel power voltage ELVDD. The first converter 610 may output the high panel power voltage ELVDD to the display panel 100.

The second converter 620 may generate a panel power voltage ELVSS based on the input voltage VIN in response to the fourth control signal CONT4. The panel power voltage ELVSS may be lower than the high panel power voltage ELVDD. In an embodiment, the second converter 620 may be a buck-boost converter. In this case, when the input voltage VIN is lower than the panel power voltage ELVSS, the second converter 620 may boost the input voltage VIN to generate the panel power voltage ELVSS, and when the input voltage VIN is higher than the panel power voltage ELVSS, the second converter 620 may step down the input voltage VIN to generate the panel power voltage ELVSS. The second converter 620 may output the panel power voltage ELVSS to the display panel 100.

Figure 2:
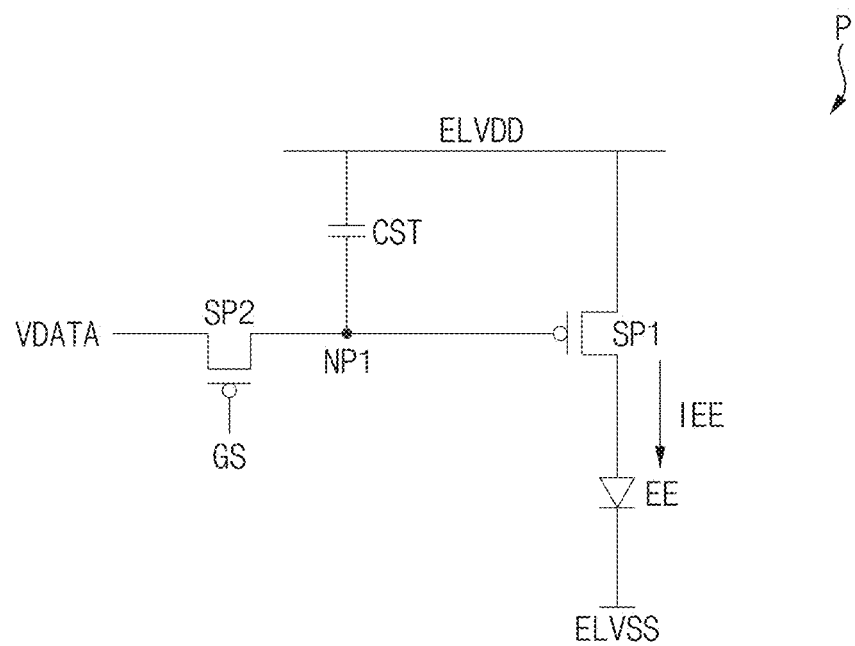
FIG. 2 is a circuit diagram illustrating a pixel according to an embodiment of the present invention.
Figure 3:
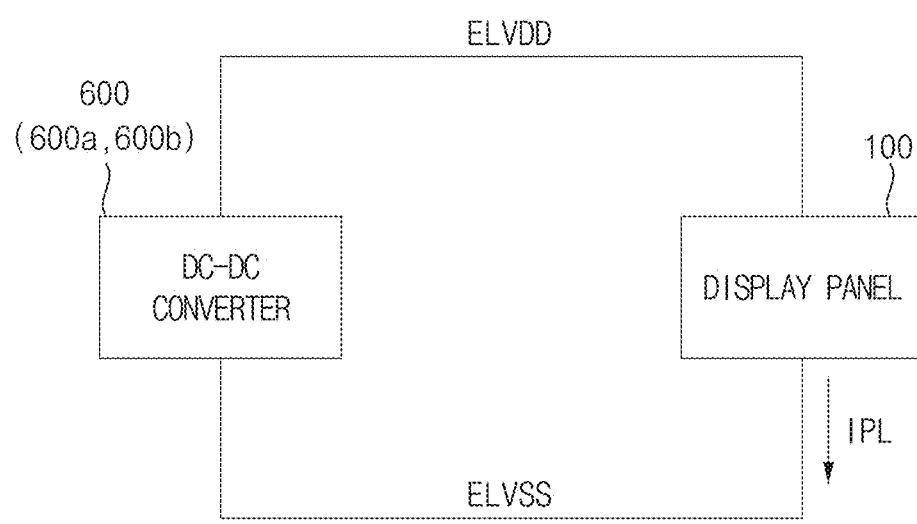
FIG. 3 is a conceptual diagram illustrating a panel current.

FIG. 2 is a circuit diagram illustrating a pixel according to an embodiment of the present invention. FIG. 3 is a conceptual diagram illustrating a panel current.

Referring to FIGS. 1 to 3, the pixel P may include a first pixel switching element SP1, a second pixel switching element SP2, a storage capacitor CST, and a light emitting element EE.

The first pixel switching element SP1 may include a gate terminal which is connected to a first pixel node NP1, a first terminal which receives the high panel power voltage ELVDD, and a second terminal which is connected to an anode of the light emitting element EE.

The second pixel switching element SP2 may include a gate terminal which receives the gate signal GS, a first terminal which receives the data voltage VDATA, and a second terminal which is connected to the first pixel node NP1.

The storage capacitor CST may include a first terminal which receives the high panel power voltage ELVDD and a second terminal which is connected to the first pixel node NP1.

The light emitting element EE may include the anode connected to the second terminal of the first pixel switching element SP1 and a cathode receiving the panel power voltage ELVSS.

In FIG. 2, the first pixel switching element SP1 and the second pixel switching element SP2 are shown as P-type transistors, but the present invention is not limited thereto. The first pixel switching element SP1 and the second pixel switching element SP2 may be N-type transistors. In FIG. 2, the pixel P is shown as including two pixel switching elements SP1, SP2 and one capacitor CST, but the present invention is not limited thereto. The pixel P may include at least three pixel switching elements or at least two capacitors.

The second pixel switching element SP2 may apply the data voltage VDATA to the first pixel node NP1 in response to the gate signal GS, the first pixel switching element SP1 may generate a driving current IEE based on the data voltage VDATA, and the driving current IEE may flow to the light emitting element EE. The light emitting element EE may emit a light based on the driving current IEE, and an intensity of a luminance may be determined depending on the intensity of the driving current IEE.

The display panel 100 may include the pixels P, and the driving current IEE may flow in each of the pixels P. Therefore, the driving current IEE may be a value in units of the pixel P, and a panel current IPL may be a value in units of the display panel 100. That is, the driving current IEE may be referred to as a current flowing in on pixel P, and the panel current IPL may be referred to as a total current flowing in the display panel 100.

In accordance with a demand for increasing a brightness, a range of the panel current IPL may broaden. Therefore, as the range of the panel current IPL broadens, a driving capability of the DC-DC converter 600 may be required to be improved. The driving capability of the DC-DC converter 600 may mean a current which the DC-DC converter 600 may tolerate. However, as the driving capability of the DC-DC converter 600 increases, the number of elements included in the DC-DC converter 600 may increase, and accordingly, an internal resistance of the DC-DC converter 600 may increase. When the internal resistance of the DC-DC converter 600 increases, a conduction loss may increase, and an unnecessary power consumption and a heat generation may increase.

For example, when the range of the panel current IPL is 0 A to 1 A, the second converter 620 may include one converter with a driving capability of 1 A. However, since an internal resistance of the one converter with the driving capability of 1 A is large, the one converter with the driving capability of 1 A may rather have a disadvantage in term of the power consumption and the heat generation for a small panel current IPL such as 0.3 A.

To solve this problem, the second converter 620 according to embodiments of present invention includes the master converter 630 and the slave converter 640. When the panel current IPL required is less than or equal to a reference current, only the master converter 630 may operate to provide the panel current IPL. When the panel current IPL required is greater than the reference current, both the master converter 630 and the slave converter 640 may operate together to provide the panel current IPL. That is, the master converter 630 may operate to generate the panel power voltage ELVSS regardless of value of the panel current IPL, and the slave converter 640 may operate to generate the panel power voltage ELVSS with the master converter 630 when the panel current IPL is higher than the reference current. A driving mode in which only the master converter 630 operates may be referred to as a "single driving mode", and a driving mode in which both the master converter 630 and the slave converter 640 operate may be referred to as a "dual driving mode".

As such, when the panel current IPL is low, the second converter 620 may use only the master converter 630 which has a small driving ability but also a small internal resistance to reduce the power consumption and heat generation, and when the panel current IPL is high, the second converter 620 may use both the master converter 630 and the slave converter 640 to improve the driving capability of the DC-DC converter 600.

Figure 4:
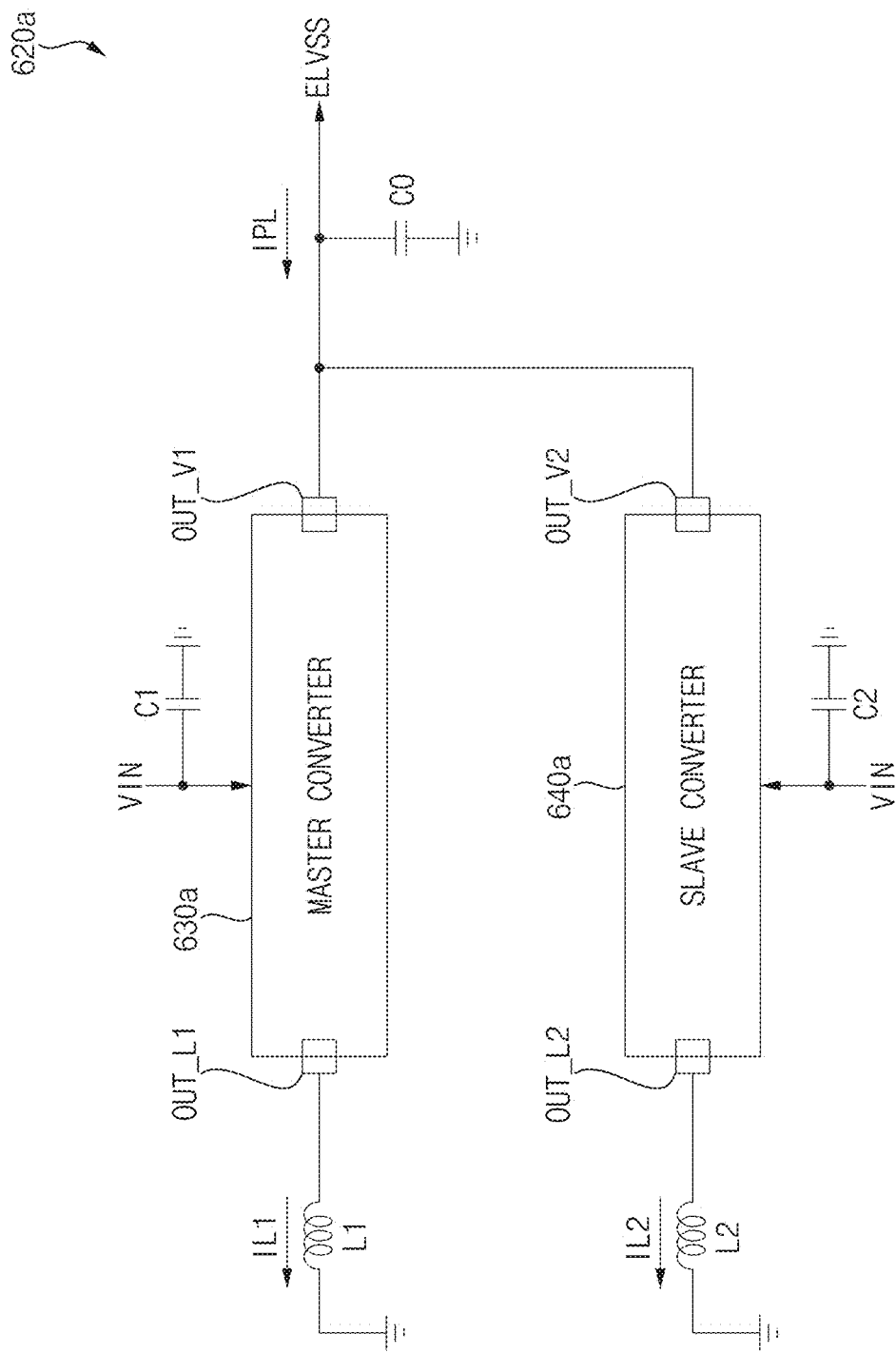
FIG. 4 is a block diagram illustrating a second converter according to an embodiment of the present invention.
Figure 5:
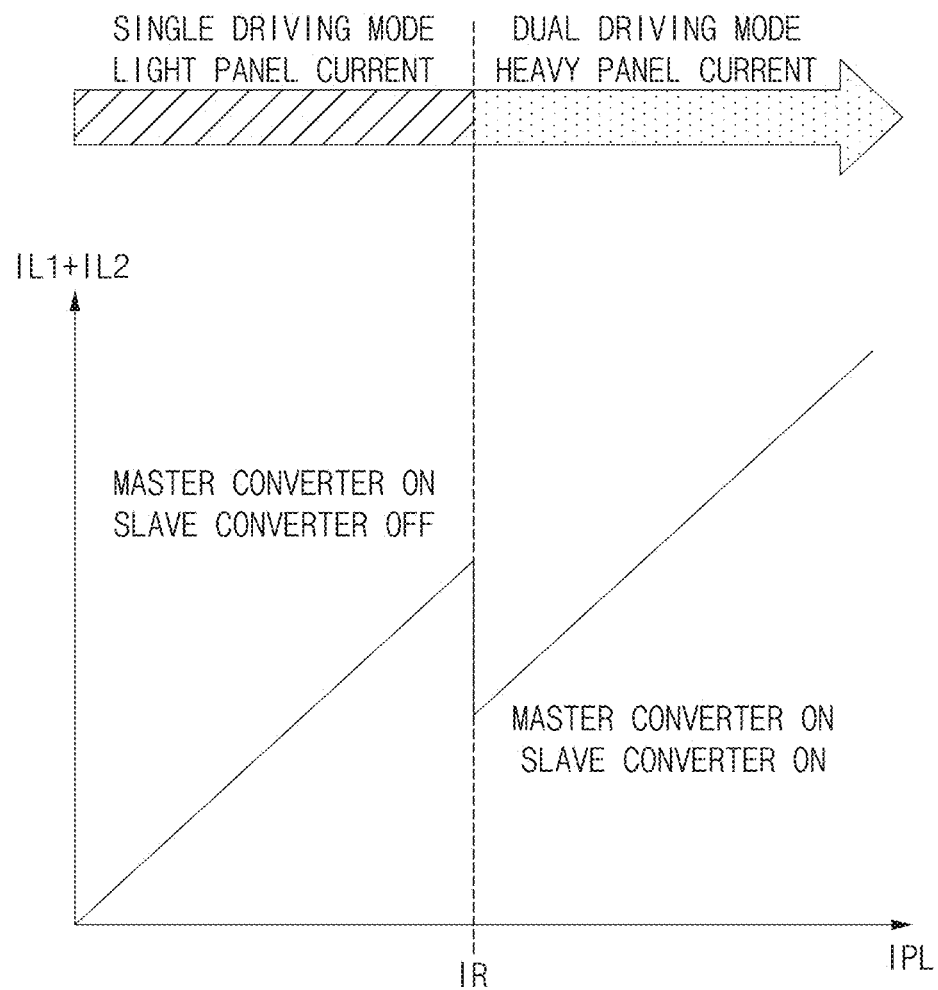
FIG. 5 is a graph illustrating an inductor current depending on a panel current of FIG. 3.

FIG. 4 is a block diagram illustrating a second converter according to an embodiment of the present invention. FIG. 5 is a graph illustrating an inductor current depending on a panel current of FIG. 3.

Referring to FIGS. 4 and 5, a second converter 620*a* of FIG. 4 may include a master converter 630*a* and a slave converter 640*a*. The master converter 630*a* may be connected to a first inductor L1 through a first inductor output terminal OUT_L1 and to an output capacitor CO through a first voltage output terminal OUT_V1. The master converter 630*a* may be connected to a first capacitor C1 and receive an input voltage VIN through a first input terminal. The slave converter 640*a* may be connected to a second inductor L2 through a second inductor output terminal OUT_L2 and to the output capacitor CO through a second voltage output terminal OUT_V2. The slave converter 640*a* may be connected to a second capacitor C2 and receive the input voltage VIN through a second input terminal. That is, the master converter 630*a* and the slave converter 640*a* may not share a common inductor. Rather, the master converter 630*a* and the slave converter 640*a* may be connected to the first inductor L1 and the second inductor L2, respectively.

As such, a case where the first inductor L1 is connected to the master converter 630*a* and the second inductor L2 is connected to the slave converter 640*a* may be referred to as a "first driving mode". The first driving mode may also be referred to as a Converter Sequential Drive ("CSD") driving mode.

As first and second switching elements included in the master converter 630*a* are alternately turned on, a first inductor current IL1 may flow in the first inductor L1 such that an electromotive force may be generated in the first inductor L1 based on the first inductor current IL1, and the input voltage VIN may be converted into a panel power voltage ELVSS based on the electromotive force.

As the third and fourth switching elements included in the slave converter 640*a* are alternately turned on, a second inductor current IL2 may flow in the second inductor L2 such that an electromotive force may be generated in the second inductor L2 based on the current IL2, and the input voltage VIN may be converted into the panel power voltage ELVSS based on the electromotive force.

A specific configuration and an operation of the DC-DC converter 600*a* in the first driving mode in which the input voltage VIN is converted into the panel power voltage ELVSS based on the electromotive force will be described later in FIGS. 7 and 8.

A single driving mode of the first driving mode may be referred to as a "first single driving mode", and a dual driving mode of the first driving mode may be referred to as a "first dual driving mode". In the first single driving mode, only the master converter 630*a* may operate, and in the first dual driving mode, both the master converter 630*a* and the slave converter 640*a* may operate.

As shown in FIG. 5, the second converter 620*a* may operate in the first driving mode. In this case, an inductor current IL1+IL2 which flows only in the first inductor L1 in a case where the panel current IPL is less than or equal to the reference current IR may flow divided into the first inductor L1 and the second inductor L2. Therefore, it may be advantageous in terms of the power consumption and the heat generation.

Figure 6:
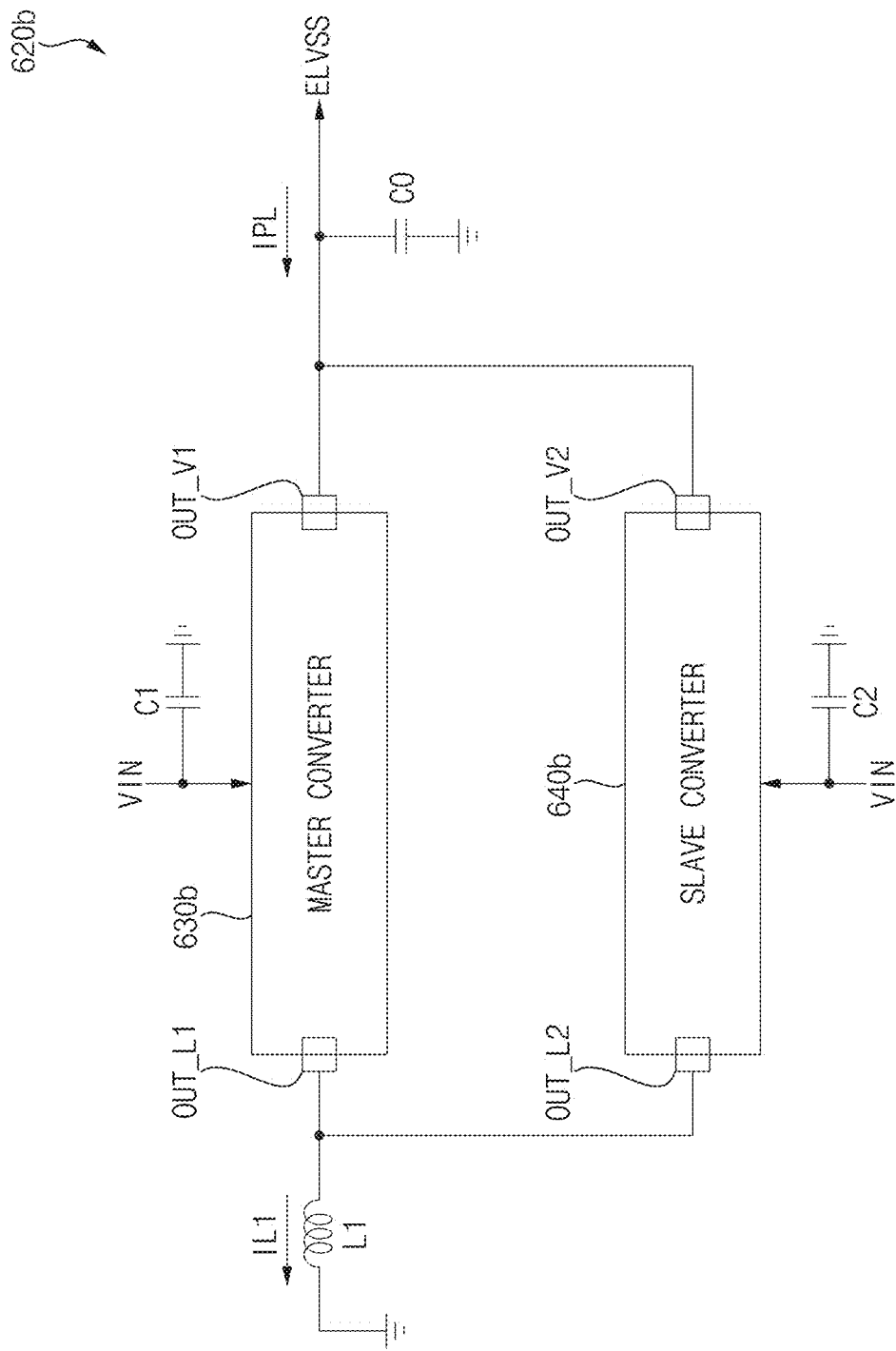
FIG. 6 is a block diagram illustrating a second converter according to another embodiment of the present invention.

FIG. 6 is a block diagram illustrating a second converter according to another embodiment of the present invention.

Referring to FIG. 6, a second converter 620*b* of FIG. 6 may include a master converter 630*b* and a slave converter 640*b*. The master converter 630*b* may be connected to a first inductor L1 through a first inductor output terminal OUT_L1 and to an output capacitor CO through a first voltage output terminal OUT_V1. The master converter 630*a* may be connected to a first capacitor C1 and receive an input voltage VIN through a first input terminal. The slave converter 640*b* may be connected to the first inductor L1 through a second inductor output terminal OUT_L2 and to the output capacitor CO through a second voltage output terminal OUT_V2. The slave converter 640*a* may be connected to a second capacitor C2 and receive the input voltage VIN through a second input terminal. That is, both the master converter 630*b* and the slave converter 640*b* may be connected to the first inductor L1.

As such, a case where the first inductor L1 is commonly connected to the master converter 630*a* and the slave converter 640*a* may be referred to as a "second driving mode". The second driving mode may also be referred to as a Single Inductor Dual Converter ("SIDC") driving mode.

As first and second switching elements included in the master converter 630*b* are alternately turned on, and third and fourth switching elements included in the slave converter 640*b* are alternately turned on, a first inductor current IL1 may flow in the first inductor L1 such that an electromotive force may be generated in the first inductor L1 based on the first inductor current IL1, and an input voltage VIN may be converted into a panel supply voltage ELVSS.

A specific configuration and an operation of the DC-DC converter 600*b* in the second driving mode in which the input voltage VIN is converted into the panel power voltage ELVSS based on the electromotive force will be described later with reference in FIG. 9.

A single driving mode of the second driving mode may be referred to as a second single driving mode, and a dual driving mode of the second driving mode may be referred to as a second dual driving mode. In the second single driving mode, only the master converter 630b may operate, and in the second dual driving mode, both the master converter 630b and the slave converter 640b may operate.

In FIGS. 4 to 6, the master converter 630 and the slave converter 640 are shown as being included in the second converter 620, but the present invention is not limited thereto. The first converter 610 may also include a master converter and at least one slave converter.

The first driving mode is described in FIGS. 4 and 5, and the second driving mode is described in FIG. 6. Cases where the second converter 620 operates in the first driving mode or the second driving mode will be described later.

The second converter 620 may operate in the first driving mode or the second driving mode depending on an electronic device (e.g., a mobile phone, a computer monitor). A mounting area of the DC-DC converter 600, the driving capability of the DC-DC converter 600, etc. may vary depending on the electronic device. Depending on the above conditions, the second converter 620 may be configured and operate in the first driving mode or the second driving mode.

In the second driving mode, since the master converter 630b and the slave converter 640b are connected to the first inductor L1 (that is, the DC-DC converter 600b do not include the second inductor L2), a mounting area of the DC-DC converter 600b in the second driving mode may be smaller than the mounting area of the DC-DC converter 600a in the first driving mode. In the second driving mode, since the master converter 630b and the slave converter 640b are connected in parallel with each other, a resultant resistance of the master converter 630b and the slave converter 640b may be approximately half an internal resistance of each of the master converter 630a, 630b and the slave converter 640a, 640b. Accordingly, the second driving mode may be more advantageous than the first driving mode in terms of the power consumption and the heat generation. However, the second driving mode may be more disadvantageous than the first driving mode in terms of the driving ability of the DC-DC converter. Therefore, for example, when the range of the panel current IPL is 0 A to 1 A, the first driving mode may be more advantageous than the second driving mode, and when the range of the panel current IPL is 0 A to 0.7 A, the second driving mode may be more advantageous than the first driving mode.

The approximate configuration and the operation of the master converter 630 and the slave converter 640 according to the first or second driving modes have been described, and the specific configuration and the operation of the master converter 630 and the slave converter 640 will be described later.

Figure 7:
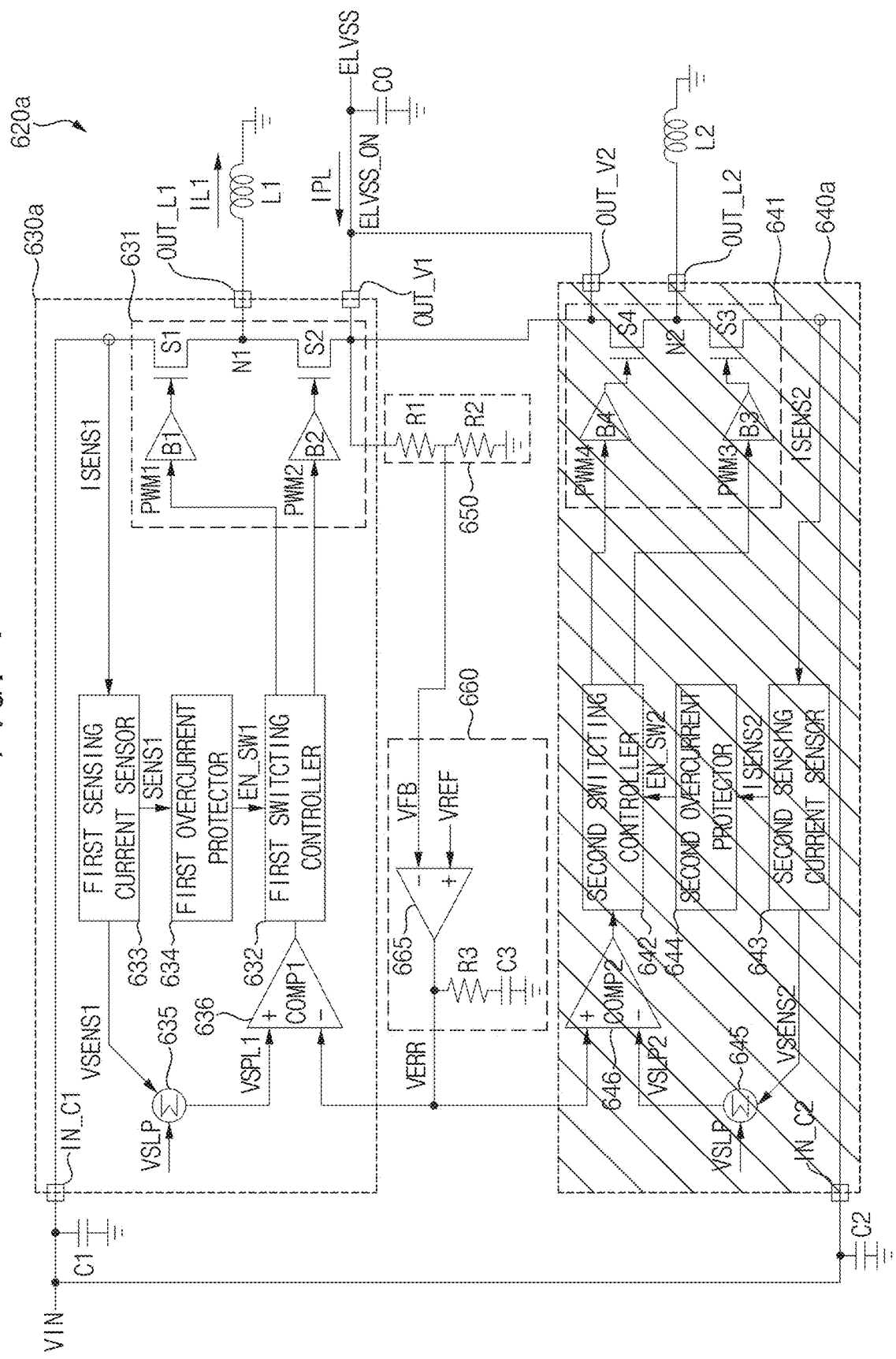
FIG. 7 is a diagram illustrating a first single driving mode of a DC-DC converter of FIG. 4.

FIG. 7 is a diagram illustrating a first single driving mode of a DC-DC converter of FIG. 4. FIG. 8 is a diagram illustrating a first dual driving mode of a DC-DC converter of FIG. 4. The areas marked with hatching in FIGS. 7, 9 and 10 indicates that parts in the areas don't operate.

Figure 8:
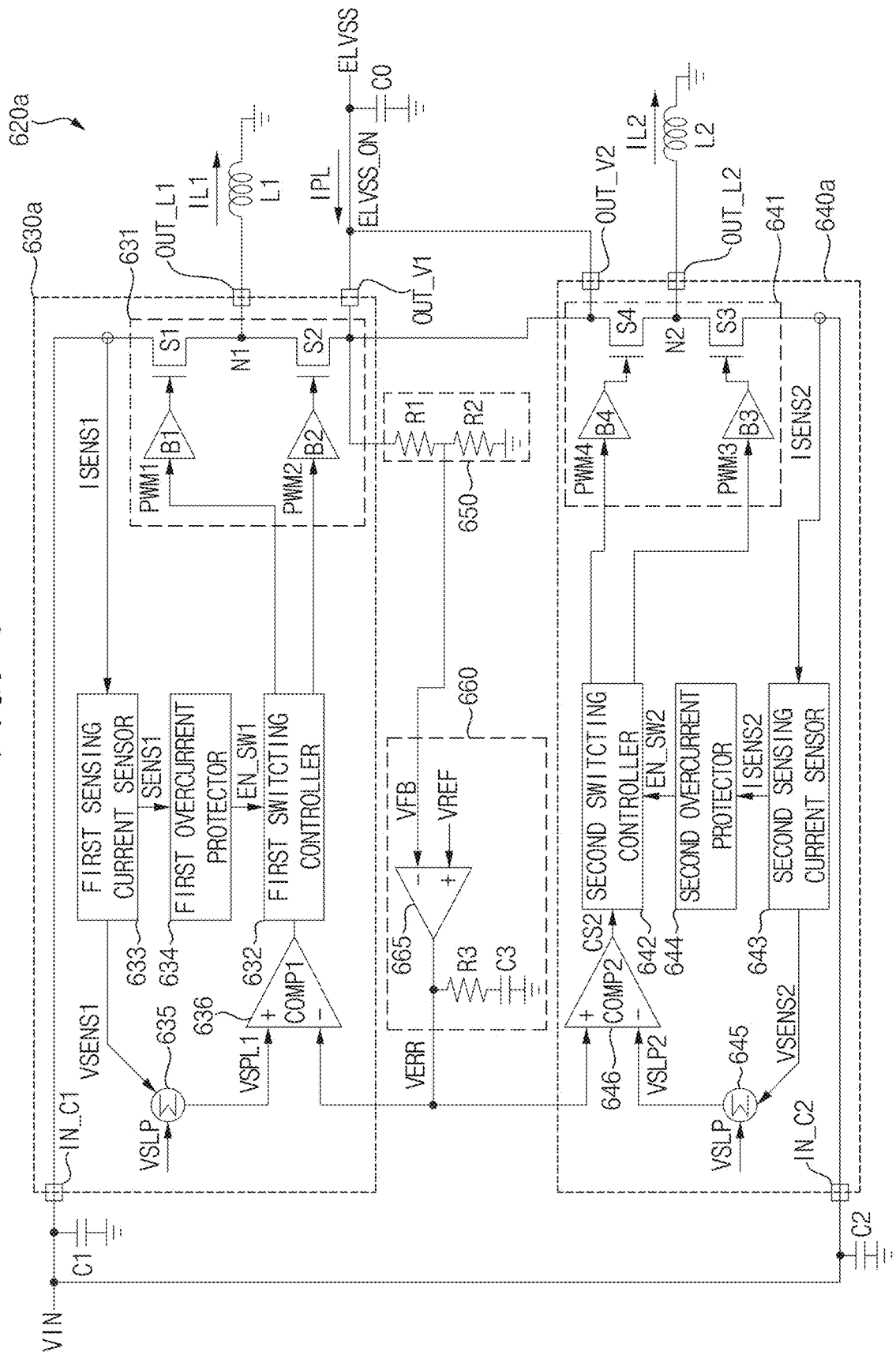
FIG. 8 is a diagram illustrating a first dual driving mode of a DC-DC converter of FIG. 4.

Referring to FIGS. 7 and 8, in a first driving mode, a DC-DC converter 600a may include a master converter 630a which generates a panel power voltage ELVSS based on an input voltage VIN regardless of a panel current IPL, and a slave converter 640a which generates the panel power voltage ELVSS based on the input voltage VIN when the panel current IPL is greater than a reference current IR.

The master converter 630a may be connected to a first capacitor C1 through a first input terminal IN_C1, to a first inductor L1 through a first inductor output terminal OUT_L1, and to an output capacitor CO through a first voltage output terminal OUT_V1. The slave converter 640a may be connected to a second capacitor C2 through a second input terminal IN_C2, to a second inductor L2 through a second inductor output terminal OUT_L2, and to the output capacitor CO through a second voltage output terminal OUT_V2. The output capacitor CO may be connected to an output node ELVSS_ON to stabilize an output of the panel power voltage ELVSS.

The DC-DC converter 600a may further include a feedback voltage generator 650 which divides the panel power voltage ELVSS to generate a feedback voltage VFB and an error signal generator 660 which generates an error signal VERR based on a voltage difference between the feedback voltage VFB and a reference voltage VREF. The feedback voltage generator 650 may include a first resistor R1 and a second resistor R2. The feedback voltage generator 650 may be connected between the output node ELVSS_ON and a ground. The error signal generator 660 may include an error amplifier 665 which generates the error signal VERR based on the voltage difference between the feedback voltage VFB and the reference voltage VREF, a third resistor R3, and a third capacitor C3. The third resistor R3 and the third capacitor C3 may be connected in series between an output terminal of the error amplifier 665 and the ground.

The master converter 630a may include a first outputer 631 which alternately turns on a first switching element S1 and a second switching element S2 to generate a first inductor current IL1 flowing in the first inductor L1. The slave converter 640a may include a second outputer 641 which alternately turns on a third switching element S3 and a fourth switching element S4 to generate a second inductor current IL2. The first outputer 631 may further include a first buffer B1 which is connected to the first switching element S1 and a second buffer B2 which is connected to the second switching element S2, and the second outputer 641 may further include a third buffer B3 which is connected to the third switching element S3 and a fourth buffer B4 which is connected to the fourth switching element S4. The first switching element S1 may be turned on based on a first switching signal PWM1, and the second switching element S2 may be turned on based on a second switching signal PWM2. When the first switching element S1 is turned on and the second switching element S2 is turned off, the first inductor current IL1 may flow in the first inductor L1 such that an electromotive force may be generated in the first inductor L1. When the first switching element S1 is turned off and the second switching element S2 is turned on after the electromotive force is generated in the first inductor L1, the input voltage VIN may be converted in to the panel power voltage ELVSS. The third switching element S3 may be turned on based on a third switching signal PWM3, and the fourth switching element S4 may be turned on based on a fourth switching signal PWM4. When the third switching element S3 is turned on and the fourth switching element S4 is turned off, the second inductor current IL2 may flow in the second inductor L2 such that an electromotive force may be generated in the inductor L2. When the third switching element S3 is turned off and the fourth switching element S4 is turned on after the electromotive force is generated in the second inductor L2, the input voltage VIN may be converted into the panel power voltage ELVSS. Each of the first switching signal PWM1, the second switching signal PWM2, the third switching signal PWM3, and the fourth switching signal PWM4 may be a Pulse Width Modulation ("PWM") signal.

The first switching element S1 may include a gate terminal which receives the first switching signal PWM1, a first terminal which receives the input voltage VIN, and a second terminal which is connected to a first node N1. The second switching element S2 may include a gate terminal which receives the second switching signal PWM2, a first terminal which is connected to the first node N1, and a second terminal which is connected to the output node ELVSS_ON. The third switching element S3 may have a gate terminal which receives the third switching signal PWM3, a first terminal which receives the input voltage VIN, and a second terminal which is connected to the second node N2. The fourth switching element S4 may include a gate terminal which receives the fourth switching signal PWM4, a first terminal which is connected to the second node N2, and a second terminal which is connected to the output node ELVSS_ON. The first inductor L1 may include a first terminal connected to the first node N1 and a second terminal connected to the ground. The second inductor L2 may include a first terminal connected to the second node N2 and a second terminal connected to the ground.

The master converter 630a may further include a first switching controller 632 which generates the first switching signal PWM1 for controlling the first switching element S1 and the second switching signal PWM2 for controlling the second switching element S2, and a first sensing current sensor 633 which senses a first sensing current ISENS1 flowing through the first switching element S1 and generates a first sensing voltage VSENS1 corresponding to the first sensing current ISENSE1. The first sensing current ISENS1 may be a current corresponding to the first inductor current IL1. The slave converter 640a may further include a second switching controller 642 which generates the third switching signal PWM3 for controlling the third switching element S3, and the fourth switching signal PWM4 for controlling the fourth switching element S4, and a second sensing current sensor 643 which senses a second sensing current ISENS2 flowing through the third switching element S3 and generates a second sensing voltage VSENS2 corresponding to the second sensing current ISENS2. The second sensing current ISENS2 may be a current corresponding to the second inductor current IL2.

The master converter 630a may further include a first overcurrent protector 634 which determines whether the first sensing current ISENS1 is an overcurrent to generate a first enable signal EN_SW1 for controlling the first switching controller 632, a first adder 635 which adds a slope voltage VSLP to the first sensing voltage VSENS1 to generate a first sensing slope voltage VSPL1, and a first comparator 636 which compares the error signal VERR with the first sensing slop voltage VSPL1 to generate a first signal CS1 and output the first signal CS1 to the first switching controller 632. The first signal CS1 may be used to generate the first switching signal PWM1 and the second switching signal PWM2. The slave converter 640a may further include a second overcurrent protector 644 which determines whether the second sensing current ISENS2 is the overcurrent to generate a second enable signal EN_SW2 for controlling the second switching controller 642, a second adder 645 which adds the slope voltage VSLP to the second sensing voltage VSENS2 to generate a second sensing slope voltage VSPL2, and a second comparator 646 which compares the error signal VERR with the second slope voltage VSPL2 to generate a second signal CS2 and output the second signal CS2 to the second switching controller 642. The second signal CS2 may be used to generate the third switching signal PWM3 and the fourth switching signal PWM4.

When the first sensing current ISENS1 is the overcurrent, the first overcurrent protector 634 may turn off the first switching controller 632, and when the second sensing current ISENS2 is the overcurrent, the second overcurrent protector 644 may turn off the second switching controller 642. The slope voltage VSLP may be a sawtooth wave. Accordingly, the first sensing slope voltage VSPL1 and the second sensing slope voltage VSPL2 may be the sawtooth wave.

As described above, in the first single driving mode, only the master converter 630a may operate, and in the first dual driving mode, both the master converter 630a and the slave converter 640a may operate.

Figure 9:
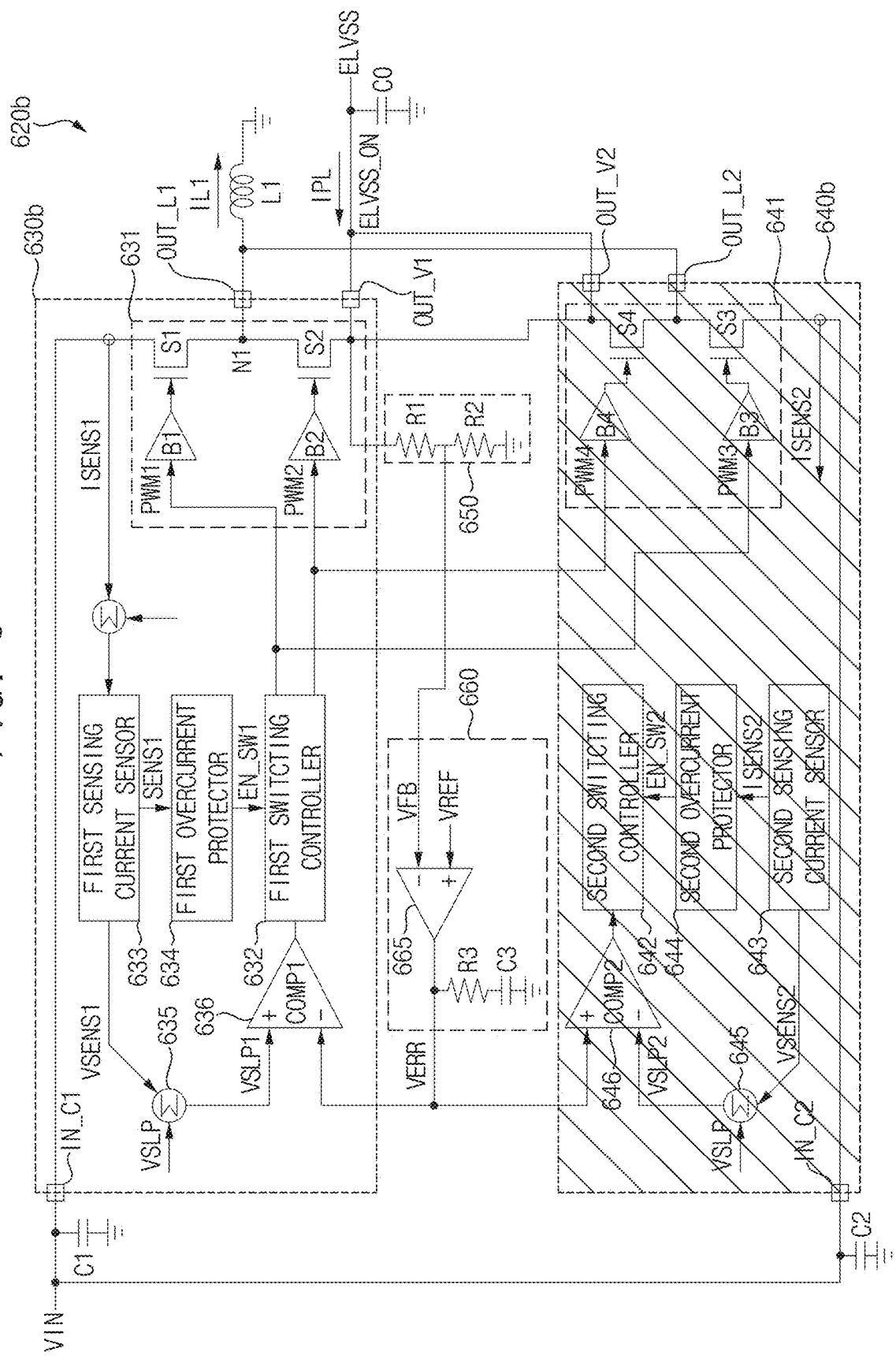
FIG. 9 is a diagram illustrating a second single driving mode of a DC-DC converter of FIG. 6.
Figure 10:
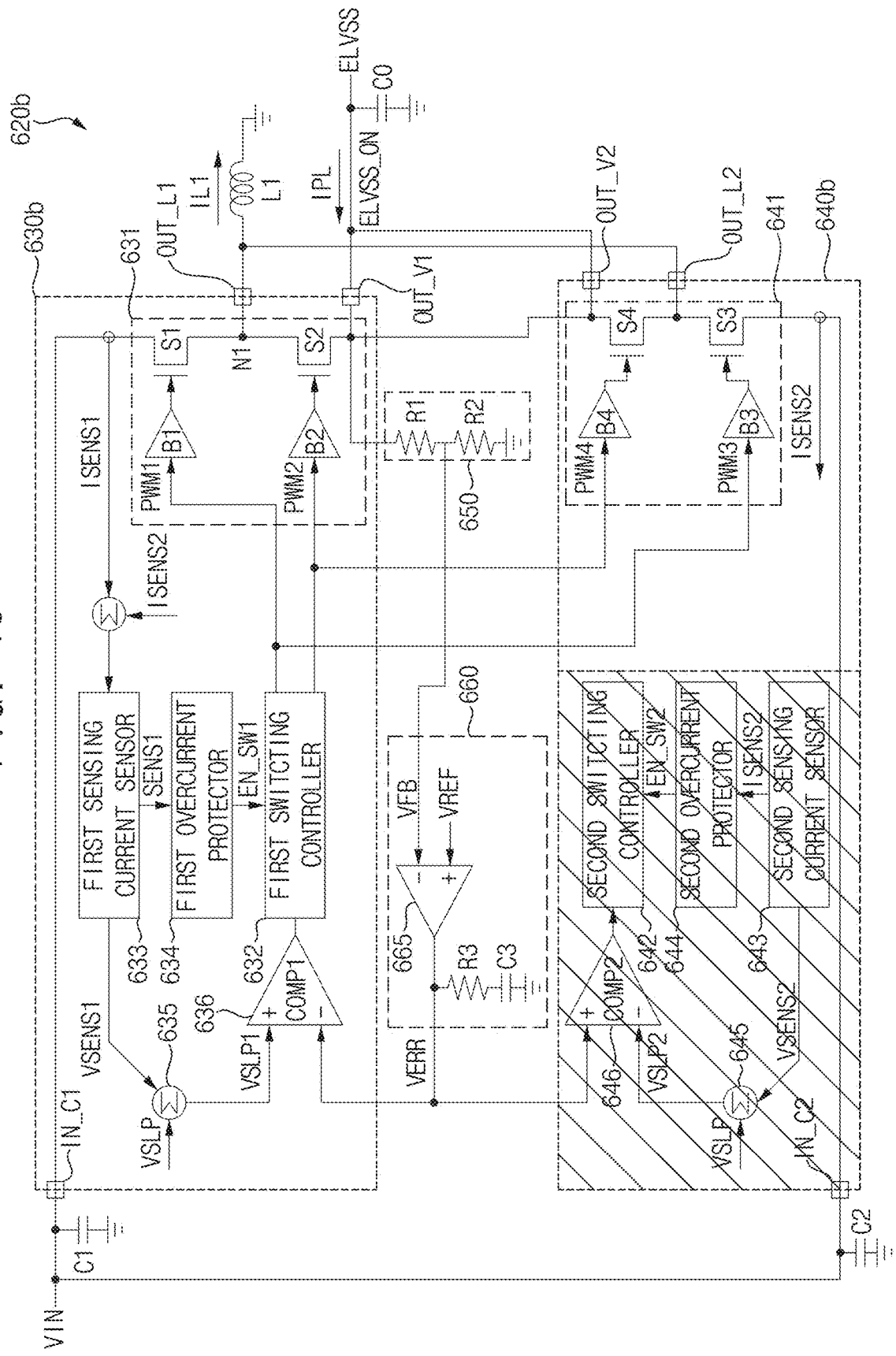
FIG. 10 is a diagram illustrating a second dual driving mode of a DC-DC converter of FIG. 6.
Figure 11:
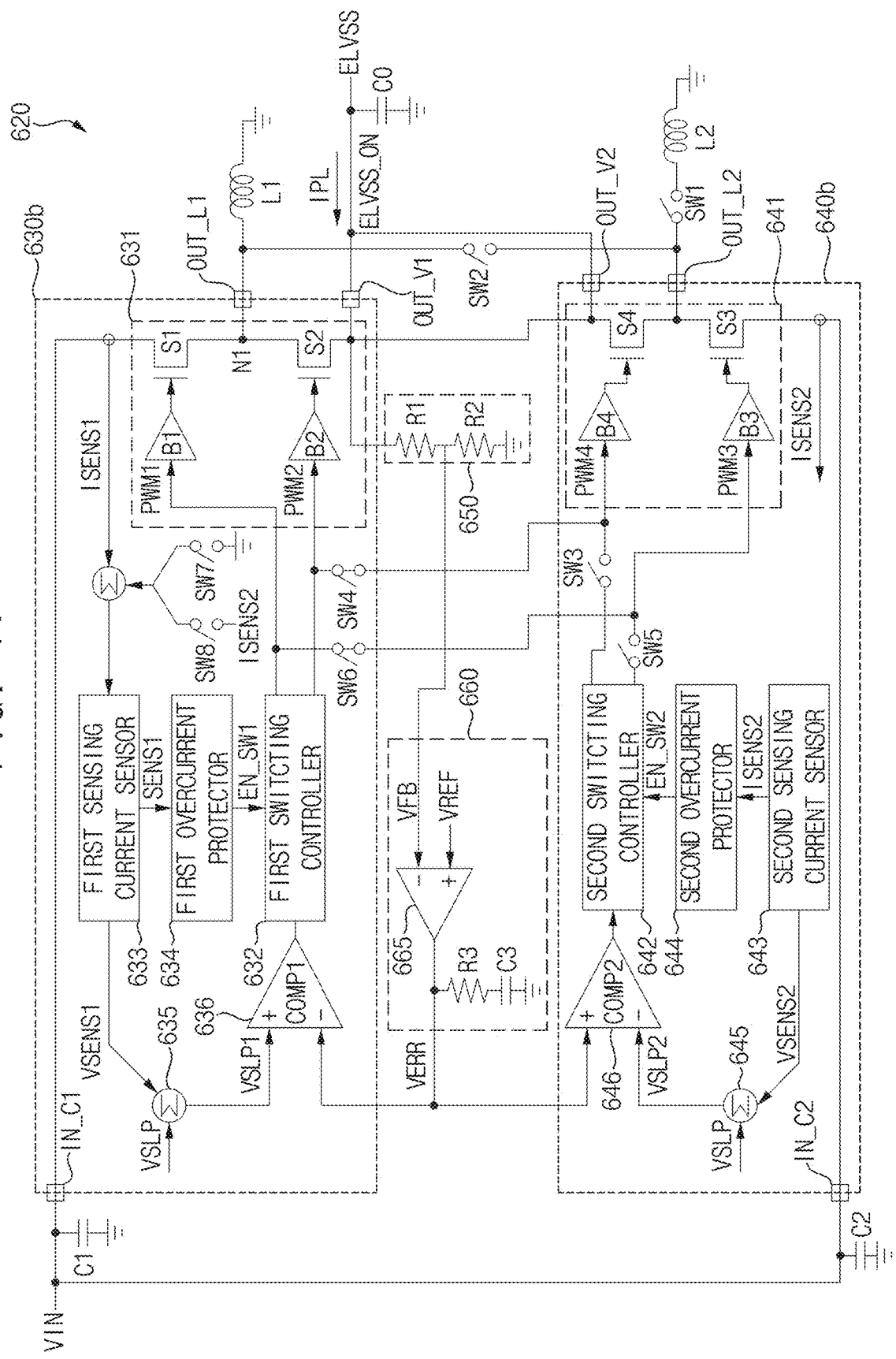
FIG. 11 is a diagram describing switching between a first driving mode and a second driving mode.

FIG. 9 is a diagram illustrating a second single driving mode of a DC-DC converter of FIG. 6. FIG. 10 is a diagram illustrating a second dual driving mode of a DC-DC converter of FIG. 6. FIG. 11 is a diagram describing switching between a first driving mode and a second driving mode.

Referring to FIGS. 9 to 11, in a second driving mode, a DC-DC converter 600b may include a master converter 630b which generates a panel power voltage ELVSS based on an input voltage VIN regardless of a panel current IPL, and a slave converter 640b which generates the panel power voltage ELVSS based on the input voltage VIN when the panel current IPL is greater than a reference current IR.

The master converter 630b may be connected to a first capacitor C1 through a first input terminal IN_C1, to a first inductor L1 through a first inductor output terminal OUT_L1, and to an output capacitor CO through a first voltage output terminal OUT_V1. The slave converter 640b may be connected to a second capacitor C2 through a second input terminal IN_C2, to a first inductor L1 through a second inductor output terminal OUT_L2, and to the output capacitor CO through a second voltage output terminal OUT_V2. The output capacitor CO may be connected to an output node ELVSS_ON to stabilize an output of the panel power voltage ELVSS.

The DC-DC converter 600b may further include a feedback voltage generator 650 which divides the panel power voltage ELVSS to generate a feedback voltage VFB and an error signal generator 660 which generates an error signal VERR based on a voltage difference between the feedback voltage VFB and a reference voltage VREF. The feedback voltage generator 650 may include a first resistor R1 and a second resistor R2. The feedback voltage generator 650 may be connected between the output node ELVSS_ON and a ground. The error signal generator 660 may include an error amplifier 665 which generates the error signal VERR based on the voltage difference between the feedback voltage VFB and the reference voltage VREF, and a third resistor R3, and a third capacitor C3. The third resistor R3 and the third capacitor C3 may be connected in series between an output terminal of the error amplifier 665 and the ground.

The master converter 630b may include a first outputer 631 which alternately turns on a first switching element S1 and a second switching element S2 to generate at least part to a first inductor current IL1 flowing in the first inductor L1. The slave converter 640b may include a second outputer 641 which alternately turns on a third switching element S3 and a fourth switching element S4 to generate the other part of the first inductor current IL1. The first outputer 631 may further include a first buffer B1 which is connected to the first switching element S1 and a second buffer B2 which is connected to the second switching element S2, and the second outputer 641 may further include a third buffer B3 which is connected to the third switching element S3 and a fourth buffer B4 which is connected to the fourth switching element S4. The first switching element S1 may be turned on based on a first switching signal PWM1, and the second switching element S2 may be turned on based on a second switching signal PWM2. When the first switching element S1 is turned on and the second switching element S2 is turned off, the first inductor current IL1 may flow in the first inductor L1 such that an electromotive force may be generated in the first inductor L1. When the first switching element S1 is turned off and the second switching element S2 is turned on after the electromotive force is generated in the first inductor L1, the input voltage VIN may be converted into the panel power voltage ELVSS. The third switching element S3 may be turned on based on a third switching signal PWM3, and the fourth switching element S4 may be turned on based on a fourth switching signal PWM4. The third switching signal PWM3 may correspond to the first switching signal PWM1. Specifically, the third switching signal PWM3 may be substantially equal to the first switching signal PWM1 except that in the second single driving mode, the first switching signal PWM1 is activated and the third switching signal PWM3 is deactivated, and in the second dual driving mode, the first switching signal PWM1 and the third switching signal are activated. The fourth switching signal PWM4 may correspond to the second switching signal PWM2. Specifically, the fourth switching signal PWM4 may be substantially equal to the second switching signal PWM2 except that in the second single driving mode, the second switching signal PWM2 is activated and the fourth switching signal PWM4 is deactivated, and in the second dual driving mode, the second switching signal PWM2 and the fourth switching signal PWM4 are activated. When the third switching element S3 is turned on and the fourth switching element S4 is turned off, the second inductor current IL2 may flow in the first inductor L1 such that an electromotive force may be generated in the first inductor L1. When the third switching element S3 is turned off and the fourth switching element S4 is turned on after the electromotive force is generated in the first inductor L1, the input voltage VIN may be converted into the panel power voltage ELVSS. Each of the first switching signal PWM1, the second switching signal PWM2, the third switching signal PWM3, and the fourth switching signal PWM4 may be a PWM signal.

The first switching element S1 may include a gate terminal which receives the first switching signal PWM1, a first terminal which receives the input voltage VIN, and a second terminal which is connected to a first node N1. The second switching element S2 may include a gate terminal which receives the second switching signal PWM2, a first terminal which is connected to the first node N1, and a second terminal which is connected to an output node ELVSS_ON. The third switching element S3 may include a gate terminal which receives the third switching signal PWM3, a first terminal which receives the input voltage VIN, and a second terminal which is connected to the first node N1. The fourth switching element S4 may include a gate terminal which receives the fourth switching signal PWM4, a first terminal which is connected to the first node N1, and a second terminal which is connected to the output node ELVSS_ON. The first inductor L1 may include a first terminal which is connected to the first node N1 and a second terminal which is connected to the ground.

The master converter 630b may further include a first switching controller 632 which generates the first switching signal PWM1 for controlling the first switching element S1, the second switching signal PWM2 for controlling the second switching element S2, the third switching signal PWM3 for controlling the third switching element S3, and the fourth switching signal PWM4, and a first sensing current sensor 633 which senses a first sensing current ISENS1 flowing through the first switching element S1 and a second sensing current ISENS2 flowing through the third switching element S3, and generates a first sensing voltage VSENS1 corresponding to sum of the first sensing current ISENS1 and the second sensing current ISENS2. The sum of the first sensing current ISENS1 and the second sensing current ISENS2 may be a current corresponding to the first inductor current IL1.

The master converter 630b may further include a first overcurrent protector 634 which determines whether sum of the first sensing current ISENS1 and the second sensing current ISENS2 is an overcurrent to generate a first enable signal EN_SW1 for controlling the first switching controller 632, a first adder 635 which adds a slope voltage VSLP to the first sensing voltage VSENS1 to generate a first sensing slope voltage VSPL1, and a first comparator 636 which compares the error signal VERR with the first sensing slope voltage VSPL1 to generate a first signal CS1 and output the first signal CS1 to the first switching controller 632. The first signal CS1 may be used to generate the first switching signal PWM1, the second switching signal PWM2, the third switching signal PWM3, and the fourth switching signal PWM4.

When the first panel current IPL1 and the second panel current IPL2 are the overcurrent, the first overcurrent protector 634 may turn off the first switching controller 632. The slope voltage VSLP may be a sawtooth wave.

When sum of the first sensing current ISENS1 and the second sensing current ISENS2 is the overcurrent, the first overcurrent protector 634 may turn off the first switching controller 632, and when the second panel current IPL2 is the overcurrent, the second overcurrent protector 644 may turn off the second switching controller 642. The slope voltage VSLP may be a sawtooth wave. Accordingly, the first sensing slope voltage VSPL1 may be the sawtooth wave.

As described above, in the second single driving mode, only the master converter 630b may operate, and in the second dual driving mode, both the master converter 630b and the slave converter 640b may operate.

In an embodiment, as shown in FIGS. 7 to 10, the DC-DC converter 600a in the first driving mode and the DC-DC converter 600b in the second driving mode may be designed and manufactured respectively in a process step.

In another embodiment, as shown in FIG. 11, both the DC-DC converter 600a in the first driving mode and the DC-DC converter 600b in the second driving mode may be designed and manufactured in the process step. In this case, the DC-DC converter 600a in the first driving mode or the DC-DC converter 600b in the second driving mode may be selected depending on a customer's a request (i.e., an electronic device) after manufacturing, and connection relationships of some elements of the DC-DC converter 600 may vary. For example, as shown in FIG. 11, the second converter 620 may further include first to eighth switches SW1 to SW8. The first switch SW1 may be disposed between the second inductor L2 and the second inductor output terminal OUT_L2, the second switch SW2 may be disposed between the first inductor L1 and the second inductor output terminal OUT_L2, the third switch SW3 may be disposed between the second switching controller 642 and the fourth buffer B4, the fourth switch SW4 may be disposed between the first switching controller 632 and the fourth buffer B4, the fifth switch SW5 may be disposed between the second switching controller 642 and the third buffer B3, and the sixth switch SW6 may be disposed between the first switching controller 632 and the third buffer B3. The seventh switch SW7 and the eighth switch SW8 determine whether the first sensing current sensor 633 receives only the first sensing current ISENS1 or both the first sensing current ISENS1 and the second sensing current ISENS2. In the first driving mode, the first switch SW1, the third switch SW3, the fifth switch SW5, and the seventh switch SW7 may be turned on, and the second switch SW2, the fourth switch SW4, the sixth switch SW6, and the eighth switch SW8 may be turned off. In the second driving mode, the first switch SW1, the third switch SW3, the fifth switch SW5, and the seventh switch SW7 may be turned off, and the second switch SW2, the fourth switch SW4, the sixth switch SW6, and the eighth switch SW8 may be turned on.

Also, in the second dual driving mode, the second switching controller 642, the second sensing current sensor 643, the second overcurrent protector 644, the second adder 645, and the second comparator 646 may be turned off, and the second outputer 641 may be turned on. Operations of the second switching controller 642, the second sensing current sensor 643, the second overcurrent protector 644, the second adder 645, and the second comparator 646 may performed by the first switching controller 632, the first sensing current sensor 633, the first overcurrent protector 634, the first adder 635, and the first comparator 636. Therefore, as described above, the first switching controller 632 may generate the third switching signal PWM3 and the fourth switching signal PWM4.

When the DC-DC converter 600$a$ in the first driving mode and the DC-DC converter 600$b$ in the second driving mode are respectively designed and manufactured in the process step, since the DC-DC converter 600$b$ in the second driving mode does not include the second inductor L2, a mounting area of the DC-DC converter 600$a$ may be reduced.

When both the DC-DC converter 600$a$ in the first driving mode and the DC-DC converter 600$b$ in the second driving mode may be designed and manufactured in the process step, the DC-DC converter 600 may be selected as the DC-DC converter 600$a$ in the first driving mode or the DC-DC converter 600$b$ in the second driving mode depending on the customer's the request (i.e., the electronic device) even after the manufacturing.

When the DC-DC converter 600 is selected as the DC-DC converter 600$a$ in the first driving mode, a hardware and a software of the DC-DC converter 600 may be set to the first driving mode, and when the DC-DC converter 600 is selected as the DC-DC converter 600$b$ in the second driving mode, the hardware and the software of the DC-DC converter 600 may be set to the second driving mode. However, despite the customer's the request, a driving mode of the hardware of the DC-DC converter 600 and a driving mode of the software of the DC-DC converter 600 may not match due to a setting mistake. For example, the hardware of the DC-DC converter 600 may be in the first driving mode and the software of the DC-DC converter 600 may be in the second driving mode. For example, the hardware of the DC-DC converter 600 may be in the second driving mode and the software of the DC-DC converter 600 may be in the first driving mode. In this case, in order to protect the DC-DC converter 600, the DC-DC converter 600 may be shut down.

In order to determine a discrepancy between the driving mode of the hardware of the DC-DC converter 600 and the driving mode of the software of the DC-DC converter 600 due to a mistake of the setting, a voltage of a common node (i.e., the second terminal of the third switching element S3) of the third switching element S3 and the fourth switching element S4 may be sensed.

For example, when the hardware of the DC-DC converter 600 is in the first driving mode and the software of the DC-DC converter 600 is in the second driving mode, the voltage of the common node of the third switching element S3 and the fourth switching element S4 may not be switched in a hardware but may be switched in a software in each single driving mode. For example, when the hardware of the DC-DC converter 600 is in the second driving mode and the software of the DC-DC converter 600 is in the first driving mode, the voltage of the common node of the third switching element S3 and the fourth switching element S4 may be switched in the hardware and may not be switched in the software in each single driving mode. Therefore, by sensing the voltage of the common node of the third switching element S3 and the fourth switching element S4, the discrepancy between the driving mode of the hardware of the DC-DC converter 600 and the driving mode of the software of the DC-DC converter 600 due to the mistake of the setting may be determined.

Figure 12:
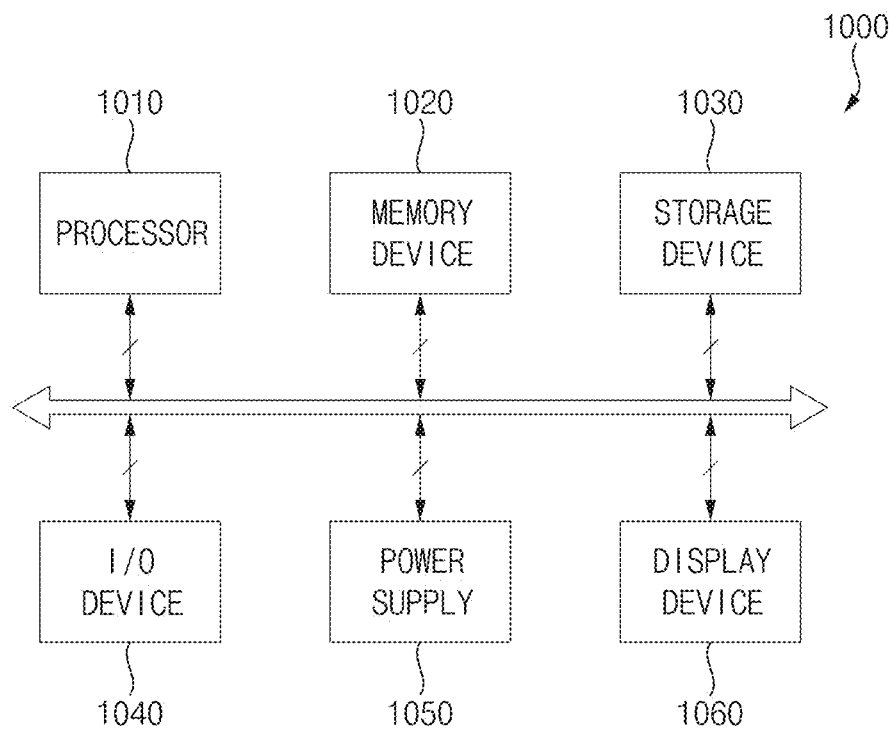
FIG. 12 is a block diagram illustrating an electronic device.
Figure 13:
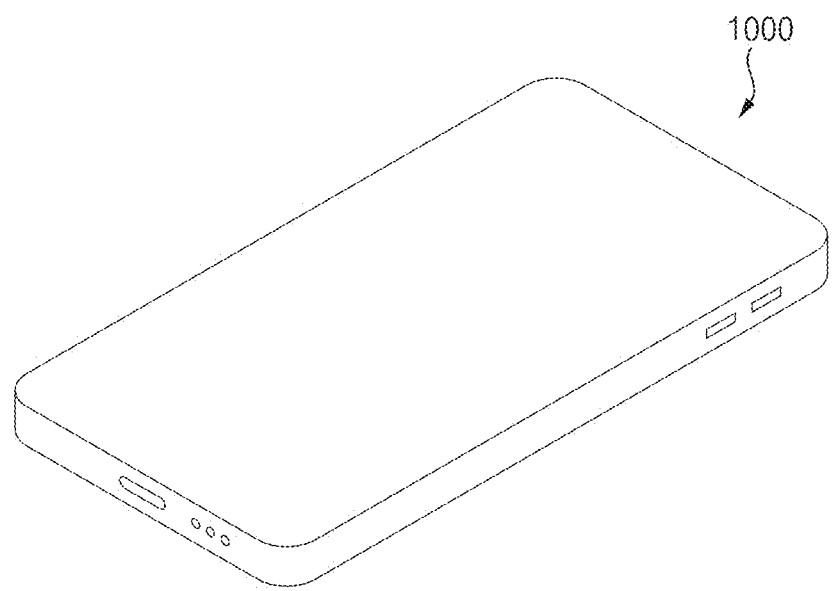
FIG. 13 is a diagram illustrating an embodiment in which the electronic device of FIG. 12 is implemented as a smart phone device.

FIG. 12 is a block diagram illustrating an electronic device. FIG. 13 is a diagram illustrating an embodiment in which the electronic device of FIG. 12 is implemented as a smart phone device.

Referring to FIGS. 12 and 13, the electronic device 1000 may include a processor 1010, a memory device 1020, a storage device 1030, an input/output ("I/O") device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus ("USB") device, other electronic devices, and the like.

In an embodiment, as illustrated in FIG. 13, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display ("HMD") device, and the like.

The processor 1010 may perform various computing functions. The processor 1010 may be a micro processor, a central processing unit ("CPU"), an application processor ("AP"), and the like. The processor 1010 may be coupled to other components via an address bus, a control bus, a data bus, and the like. Further, the processor 1010 may be coupled to an extended bus such as a peripheral component interconnection ("PCI") bus.

The memory device 1020 may store data for operations of the electronic device 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like.

The storage device 1030 may include a solid state drive ("SSD") device, a hard disk drive ("HDD") device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventions may be applied to any display device and any electronic device including the touch panel. For example, the inventions may be applied to a mobile phone, a smart phone, a tablet computer, a digital television ("TV"), a 3D TV, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A direct current to direct current (DC-DC) converter comprising:
   a master converter configured to operate to generate a panel power voltage based on an input voltage regardless of a panel current; and
   a slave converter configured to operate to generate the panel power voltage with the master converter based on the input voltage when the panel current is greater than a reference current,
   wherein the master converter and the slave converter are connected to a first inductor,
   wherein the master converter includes a first outputer configured to alternately turn on a first switching element and a second switching element to generate at least part of a first inductor current which flows in the first inductor,
   wherein the slave converter includes a second outputer configured to alternately turn on a third switching element and a fourth switching element to generate at least part of the first inductor current,
   wherein the first switching element, the second switching element, the third switching element and the fourth switching element are connected to the first inductor
   wherein the master converter further includes:
   a first switching controller configured to generate a first switching signal which controls the first switching element, a second switching signal which controls the second switching element, a third switching signal which controls the third switching element and corresponds to the first switching signal, and a fourth switching signal which controls the fourth switching element and corresponds to the second switching signal; and
   a first sensing current sensor configured to sense a first sensing current which flows through the first switching element and a second sensing current which flows through the third switching element, and generate a first sensing voltage which corresponds sum of the first sensing current and the second sensing current.

2. The DC-DC converter of claim 1,
   wherein, when the panel current is less than or equal to the reference current, the panel current flows to the master converter, and
   wherein, when the panel current is greater than the reference current, the panel current flows divided into the master converter and the slave converter.

3. The DC-DC converter of claim 1,
   wherein, when the panel current is less than or equal to the reference current, the master converter is configured to generate a first inductor current which flows in the first inductor, and
   wherein, when the panel current is greater than the reference current, the master converter and the slave converter is configured to generate the first inductor current together.

4. The DC-DC converter of claim 1, wherein, when the panel current is greater than the reference current, the master converter and the slave converter are connected in parallel.

5. The DC-DC converter of claim 4, wherein, when the master converter and the slave converter are connected in parallel, a resultant resistance of the master converter and the slave converter is smaller than an internal resistance of each of the master converter and the slave converter.

6. The DC-DC converter of claim 1, further comprising:
   a feedback voltage generator configured to divide the panel power voltage to generate a feedback voltage; and
   an error signal generator configured to generate an error signal based on a voltage difference between the feedback voltage and a reference voltage.

7. The DC-DC converter of claim 1, wherein the master converter further includes:
   a first overcurrent protector configured to determine whether the sum of the first sensing current and the second sensing current is an overcurrent to generate a first enable signal which controls the first switching controller;
   a first adder configured to add a slope voltage to the first sensing voltage to generate a first sensing slope voltage; and
   a first comparator configured to compare the error signal and the first sensing slope voltage to generate a first signal and output the first signal to the first switching controller.

8. The DC-DC converter of claim 1, wherein
the first switching element includes a gate terminal which receives the first switching signal, a first terminal which receives the input voltage, and a second terminal which is connected to a first node,
the second switching element includes a gate terminal which receives the second switching signal, a first terminal which is connected to the first node, and a second terminal which is connected to an output node,
the third switching element includes a gate terminal which receives the third switching signal, a first terminal which receives the input voltage, and a second terminal which is connected to the first node,
the fourth switching element includes a gate terminal which receives the fourth switching signal, a first terminal which is connected to the first node, and a second terminal which is connected to the output node, and
the first inductor includes a first terminal which is connected to the first node and a second terminal which is connected to a ground.

9. A direct current to direct current (DC-DC) converter comprising:
a master converter configured to operate to generate a panel power voltage based on an input voltage regardless of a panel current; and
a slave converter configured to operate to generate the panel power voltage with the master converter based on the input voltage when the panel current is greater than a reference current,
wherein, in a first driving mode, the master converter is connected to a first inductor and the slave converter is connected to a second inductor,
wherein, in a second driving mode, the master converter and the slave converter are connected to the first inductor,
wherein the master converter includes a first outputer configured to alternately turn on a first switching element and a second switching element to generate a first inductor current which flows in the first inductor in the first driving mode and at least part of the first inductor current in the second driving mode,
wherein the slave converter includes a second outputer configured to alternately turn on a third switching element and a fourth switching element to generate a second inductor current which flows in the second inductor in the first driving mode, and to alternately turn on the third switching element and the fourth switching element to generate at least part of the first inductor current in the second driving mode,
wherein the first switching element and the second switching element are connected to the first inductor in the first driving mode and the second driving mode, and
wherein the third switching element and the fourth switching element are connected to the first inductor in the first driving mode and are connected to the second inductor in the second driving mode.

10. The DC-DC converter of claim 9,
wherein, in the first driving mode and the second driving mode, when the panel current is less than or equal to the reference current, the panel current flows to the master converter, and
wherein, in the first driving mode and the second driving mode, when the panel current is greater than the reference current, the panel current flows divided into the master converter and the slave converter.

11. The DC-DC converter of claim 9, wherein, in the first driving mode and the second driving mode, when the panel current is less than or equal to the reference current, the master converter is configured to generate a first inductor current which flows in the first inductor.

12. The DC-DC converter of claim 11,
wherein, in the first driving mode, when the panel current is greater than the reference current, the master converter is configured to generate the first inductor current, and the slave converter is configured to generate a second inductor current which flows in the second inductor, and
wherein, in the second driving mode, when the panel current is greater than the reference current, the master converter and the slave converter are configured to generate the first inductor current together.

13. The DC-DC converter of claim 9, wherein, in the second driving mode, when the panel current is greater than the reference current, the master converter and the slave converter are connected in parallel.

14. The DC-DC converter of claim 13, wherein, in the second driving mode, when the master converter and the slave converter are connected in parallel, a resultant resistance of the master converter and the slave converter is smaller than an internal resistance of each of the master converter and the slave converter.

15. The DC-DC converter of claim 9, further comprising:
a feedback voltage generator configured to divide the panel power voltage to generate a feedback voltage; and
an error signal generator configured to generate an error signal based on a voltage difference between the feedback voltage and a reference voltage.

16. The DC-DC converter of claim 9,
wherein the master converter further includes:
a first switching controller configured to generate a first switching signal which controls the first switching element and a second switching signal which controls the second switching element in the first driving mode, and to generate the first switching signal, the second switching signal, and a third switching signal which controls the third switching element and corresponds to the first switching signal and a fourth switching signal which controls the fourth switching element and corresponds to the second switching signal in the second driving mode; and
a first sensing current sensor configured to sense a first sensing current which flows through the first switching element and generate a first sensing voltage which corresponds the first sensing current in the first driving mode, and to sense the first sensing current and a second sensing current which flows through the third switching element and generate the first sensing voltage which corresponds to sum of the first sensing current and the second sensing current in the second driving mode, and
wherein the slave converter further includes:
a second switching controller configured to generate the third switching signal and the fourth switching signal in the first driving mode; and
a second sensing current sensor configured to sense the second sensing current and generate a second sensing voltage which corresponds to the second sensing current in the first driving mode.

17. The DC-DC converter of claim 16,
wherein the master converter further includes:
- a first overcurrent protector configured to determine whether the first sensing current is an overcurrent to generate a first enable signal which controls the first switching controller in the first driving mode, and to determine whether the sum of the first sensing current and the second sensing current is the overcurrent to generate the first enable signal in the second driving mode;
- a first adder configured to add a slope voltage to the first sensing voltage to generate a first sensing slope voltage; and
- a first comparator configured to compare the error signal and the first sensing slope voltage to generate a first signal and output the first signal to the first switching controller, and wherein the slave converter further includes:
- a second overcurrent protector configured to determine whether the second sensing current is the overcurrent to generate a second enable signal which controls the second switching controller in the first driving mode;
- a second adder configured to add the slope voltage to the second sensing voltage to generate a second sensing slope voltage; and
- a second comparator configured to compare the error signal and the second sensing slope voltage to generate a second signal and output the second signal to the second switching controller.

18. The DC-DC converter of claim 9, wherein a voltage of a common node of the third switching element and the fourth switching element is sensed such that a shutdown operation is performed.

19. A display device comprising:
- a display panel including pixels; and
- a direct current to direct current (DC-DC) converter configured to output a panel power voltage to the display panel, wherein the DC-DC converter includes:
- a master converter configured to operate to generate the panel power voltage based on an input voltage regardless of a panel current; and
- a slave converter configured to operate to generate the panel power voltage with the master converter based on the input voltage when the panel current is greater than a reference current, wherein, in a first driving mode, the master converter is connected to a first inductor and the slave converter is connected to a second inductor, and wherein, in a second driving mode, the master converter and the slave converter are connected to the first inductor, wherein the master converter includes a first outputer configured to alternately turn on a first switching element and a second switching element to generate a first inductor current which flows in the first inductor in the first driving mode and at least part of the first inductor current in the second driving mode, wherein the slave converter includes a second outputer configured to alternately turn on a third switching element and a fourth switching element to generate a second inductor current which flows in the second inductor in the first driving mode, and to alternately turn on the third switching element and the fourth switching element to generate at least part of the first inductor current in the second driving mode, wherein the first switching element and the second switching element are connected to the first inductor in the first driving mode and the second driving mode, and wherein the third switching element and the fourth switching element are connected to the first inductor in the first driving mode and are connected to the second inductor in the second driving mode.

* * * * *